US012116731B2

(12) United States Patent
Cartier et al.

(10) Patent No.: US 12,116,731 B2
(45) Date of Patent: Oct. 15, 2024

(54) COMPOSTABLE CELLULOSE-BASED PAPER FOR GAS BARRIER IN PACKAGING MATERIAL

(71) Applicant: Ahlstrom Oyj, Helsinki (FI)

(72) Inventors: Noel Cartier, Jardin (FR); Hervé Planchard, Crach (FR)

(73) Assignee: AHLSTROM OYJ, Helsinki (FI)

( * ) Notice: Subject to any disclaimer, the term of this patent is extended or adjusted under 35 U.S.C. 154(b) by 238 days.

(21) Appl. No.: 17/774,615

(22) PCT Filed: Nov. 6, 2020

(86) PCT No.: PCT/EP2020/081281
§ 371 (c)(1),
(2) Date: May 5, 2022

(87) PCT Pub. No.: WO2021/089778
PCT Pub. Date: May 14, 2021

(65) Prior Publication Data
US 2022/0403601 A1    Dec. 22, 2022

(30) Foreign Application Priority Data
Nov. 7, 2019 (EP) ..................................... 19207684

(51) Int. Cl.
*D21H 27/10* (2006.01)
*B32B 27/10* (2006.01)
(Continued)

(52) U.S. Cl.
CPC ............. *D21H 27/10* (2013.01); *B32B 27/10* (2013.01); *B32B 29/00* (2013.01); *B65D 65/466* (2013.01);
(Continued)

(58) Field of Classification Search
CPC ........ D21H 27/10; D21H 17/63; D21H 17/64; D21H 17/65; B32B 27/10; B32B 29/00;
(Continued)

(56) References Cited

U.S. PATENT DOCUMENTS

| 2,056,294 A | 10/1936 | Richter |
| 5,362,776 A | 11/1994 | Barenberg et al. |

(Continued)

FOREIGN PATENT DOCUMENTS

| CN | 1240166 A | 1/2000 |
| CN | 101553360 A | 10/2009 |

(Continued)

OTHER PUBLICATIONS

International Search Report for International Application No. PCT/EP2020/081281; International Filing Date Nov. 6, 2020; Date of Mailing Nov. 25, 2020; 3 pages.

(Continued)

*Primary Examiner* — James C Yager
(74) *Attorney, Agent, or Firm* — CANTOR COLBURN LLP

(57) ABSTRACT

This invention relates to a compostable cellulose-based paper having an oxygen transmission rate of less than 10 $cm^3/(m^2\ day)$, when determined at 23° C. and 50% relative humidity, the compostable cellulose-based paper comprising a continuous cellulosic fiber matrix that comprises native cellulosic fibers and non-fibrous cellulosic material, wherein the content of the non-fibrous cellulosic material in the continuous cellulosic fiber matrix is of from 15 to 50 wt. %.

20 Claims, 2 Drawing Sheets

(51) Int. Cl.
  *B32B 29/00* (2006.01)
  *B65D 65/46* (2006.01)
  *D21H 17/64* (2006.01)
  *D21H 17/65* (2006.01)

(52) U.S. Cl.
  CPC .............. *D21H 17/64* (2013.01); *D21H 17/65* (2013.01); *B32B 2307/558* (2013.01); *B32B 2307/718* (2013.01); *B32B 2307/7244* (2013.01); *Y10T 428/1303* (2015.01)

(58) Field of Classification Search
  CPC ........ B32B 2307/558; B32B 2307/718; B32B 2307/7244; B65D 65/466; Y02W 90/10; Y10T 428/1303
  See application file for complete search history.

(56) References Cited

U.S. PATENT DOCUMENTS

| | | | |
|---|---|---|---|
| 9,956,741 | B2 | 5/2018 | Planchard |
| 10,358,772 | B2 | 7/2019 | Heiskanen et al. |

FOREIGN PATENT DOCUMENTS

| | | | |
|---|---|---|---|
| WO | 02084029 | A2 | 10/2002 |
| WO | 2008084139 | A1 | 7/2008 |
| WO | 2011147825 | A1 | 12/2011 |
| WO | 2016186645 | A1 | 11/2016 |
| WO | 2017187024 | A1 | 11/2017 |
| WO | 2018197676 | A1 | 11/2018 |

OTHER PUBLICATIONS

Written Opinion for International Application No. PCT/EP2020/081281; International Filing Date Nov. 6, 2020; Date of Mailing Nov. 25, 2020; 5 pages.

Kostag, M. et al., Recent Advances in Solvents for the Dissolution Shaping and Derivatization of Cellulose: Quaternary Ammonium Electrolytes and their solutions in Water and Molecular Solvents, Molecules 2018, 23,511.

Mayer, Ferdinand F (May 1860). "Technical Intelligence-Vegetable Parchment-Papyrene". The American Journal of Science and Arts. XXIX (LXXXVI): pp. 278-280.

Notice of Opposition Against European Patent 3 819 426 B1, Opponent UPM-Kymmene Oyj, dated Dec. 29, 2023, 33 pages.

Packaging—Requirements For Packaging Recoverable Through Composting and Biodegration—Test Scheme and Evaluation Criteria for the Final Acceptance of Packaging, European Standard EN 13432:2000, Sep. 2000, 24 pages.

Park et al., Cellulose crystallinity index: measurement techniques and their impact on interpreting cellulase performance, Biotechnology for Biofuels 2010, 3:10.

Preliminary Opinion of the Opposition Division, Opposition Against European Patent 3 819 426, dated Jul. 1, 2024, 12 pages.

Proprietor's Response to Opposition Against European Patent 3 819 426, filed May 16, 2024, 23 pages.

Summons to Attend Oral Hearing in Opposition Against European Patent 3 819 426, dated Jul. 1, 2024, 1 page.

Who would have thought a pig's bladder could be so useful?, https://steemit.com/science/@giantbear/who-wouldv-e-thought-a-pig-s-bladder-could-be-so-useful, Nov. 26, 2017, 11 pages.

COMPOSTABLE CELLULOSE-BASED PAPER FOR GAS BARRIER IN PACKAGING MATERIAL

CROSS REFERENCE TO RELATED APPLICATIONS

This application is a National Stage application of PCT/EP2020/081281, filed Nov. 6, 2020, which claims the benefit of Europe Application No. 19207684.2, filed Nov. 7, 2019, both of which are incorporated by reference in their entireties herein.

TECHNICAL FIELD

The present invention relates to compostable cellulose-based paper that can be used as gas barrier layer in food packaging materials. Further aspects of the present invention include packaging materials for oxygen sensitive products comprising the compostable cellulose-based paper described herein.

BACKGROUND ART

Packaging materials cause a large amount of waste, which many countries presently try to reduce by exchanging fuel based plastic packaging materials with fully biodegradable, compostable and bio-sourced packaging materials. Cellulose fibers are known as biodegradable packaging material. Such biodegradable packing materials must fulfil various conditions when being used as food packaging coming into contact with food. In particular, when used as packaging material for oxygen-sensitive products, sufficient gas barrier properties of the packaging material are required.

In order to achieve the desired gas barrier properties, the biodegradable packaging material made of cellulose fibers is usually laminated with an additional gas barrier layer.

EP 2 841 263 A1 describes a multilayer article comprising a biodegradable polymer-based layer and a cellulose fiber-based support, which are bonded together by an adhesive. However, the dissolution of the adhesive can lead to a delamination of the multi-layered structure being split into individual layers. In this case, the desired gas barrier properties and mechanical properties of the packaging material cannot be maintained.

WO 2017/187024 A1 and WO 2018/197676 A1 both relate to a compostable lid for sealing beverages, which is composed of a multi-layered structure comprising a nonwoven layer containing at least 50% by weight of biodegradable fibers and a support layer consisting of a vegetable parchment. WO 2008/084139 A1 describes a multi-layered product that may be used as sausage casing, which is a reinforced composite parchmented sheet comprising a first nonwoven support layer of precipitated cellulose material and a second nonwoven layer of thermoplastic fibers that are entangled with cellulose fibers. The layers in said multi-layered products are bonded by treating the cellulose-containing layer with a gelatinizing agent to partially dissolve the cellulose material (parchmentizing process) and form gelatinized cellulose material which acts as an adhesive between the layers.

These prior art approaches are however still not satisfactory as the gas barrier properties of these products are only achieved by including an additional layer to the biodegradable cellulose support layer providing the desired mechanical reinforcement properties of the packaging material. The manufacture of the prior art material, therefore, involves multiple process steps. These steps consume energy and create waste and require a large amount of time and costs.

Furthermore, as the multi-layered products described in the prior art contain synthetic fibers, it is difficult to obtain 100% biodegradability. Another problem occurs in these products, as the synthetic fibers contained in the multi-layered structures of the prior art do not dissolve in the parchmentizing process and present an additional interface between the composite and the fibers that reduces the gas barrier properties.

In order to achieve sufficient gas barrier properties and desired mechanical reinforcement properties, the following two approaches concerning the viscose impregnation of a fibrous web have been known. One approach includes adding a polymer film made from regenerated cellulose (e.g. a viscose film), which is obtained by extrusion or coating and which serves as a good gas barrier, to a biodegradable cellulose support (base paper). This approach however has the problem that the laminate may not have sufficient strength under moist conditions and delamination of the gas barrier film may occur due to exposure with steam or moisture. The other approach includes adding or using regenerated or nano-cellulose in the wet-laid cellulose base paper. However, in this other approach, it is difficult to add enough nanocellulose to the structure by coating or impregnation and sufficient gas barrier properties cannot be achieved. Furthermore, the energy consumption for the production of nanocellulose is high and it is difficult to impregnate the base paper with enough nanocellulose due to its low consistency.

Known products such as fibrous meat casing made of regenerated cellulose cannot offer sufficient gas barrier properties, in particular towards oxygen, because the structure of these products remains porous. Even though it is also possible to form gas barrier films from regenerated cellulose, these barrier films cannot provide the desired reinforcing mechanical properties due to the absence of fibres in the material.

Therefore, it is an object of the present invention to provide an improved biodegradable packaging material having sufficient gas barrier properties and reinforcing mechanical properties that is easy to manufacture in an energy and waste-efficient way. A further object of the present invention is the provision of a biodegradable packaging material having excellent mechanical properties with respect to for example wet strength, wet burst strength and dry burst strength.

Compared to a regenerated cellulose film, this invention has better mechanical properties due to the presence of fibers in the material. Compared to the existing wet-laid products comprising regenerated cellulose, this invention offers better gas barrier properties due to the continuous non-porous structure. Concerning nano-cellulose, it has not yet been possible to develop an a nano-cellulose-based material having sufficient barrier properties on an industrial scale that is economically viable in terms of energy consumption.

SUMMARY OF THE INVENTION

The present invention solves the problems of the prior art by the following means.

In a first aspect, the present invention relates to a compostable cellulose-based paper having an oxygen transmission rate of less than 10 $cm^3/(m^2 \cdot day)$, when determined at 23° C. and 50% relative humidity, the compostable cellulose-based paper comprising a continuous cellulosic fiber matrix that comprises native cellulosic fibers and non-fibrous cellulosic material, wherein the content of the non-fibrous cellulosic material in the continuous cellulosic fiber matrix is of from 15 to 50 wt. %.

It has been found that the compostable cellulose-based paper comprising 15 to 50 wt. % of non-fibrous cellulosic material in a continuous cellulosic fiber matrix solves the problems of the prior art by simultaneously providing excellent gas barrier properties and reinforcing mechanical properties in one layer. Moreover, a further advantage resides in the fact that preparing the compostable cellulose-based paper as described herein helps to save energy and minimize waste as compared to prior art procedures.

In a second aspect, the present invention relates to a packaging material for oxygen sensitive products comprising the compostable cellulose-based paper described herein.

DETAILED DESCRIPTION OF THE INVENTION

Figure 1A:
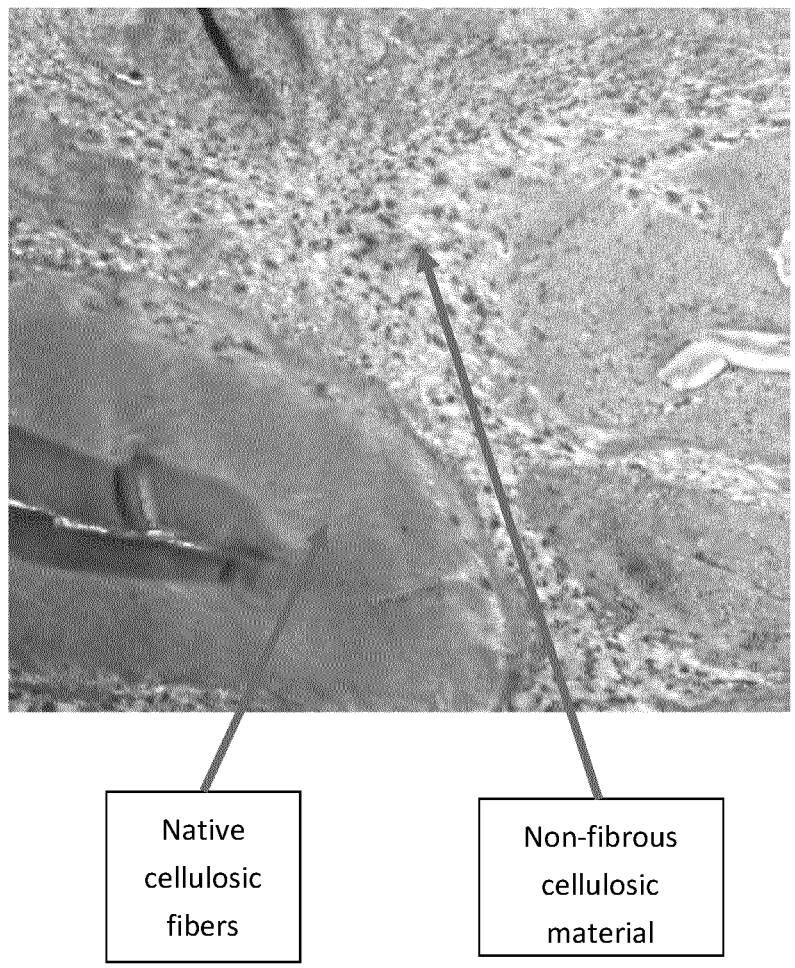
FIG. 1a shows a continuous cellulosic fiber matrix of a compostable cellulose-based paper according to an exemplary embodiment of the present invention as measured with a Transmission electron microscope (Transmission Electron Microscopy (TEM), Philips EM 400T, magnification of ×3000).

The present invention relates to a compostable cellulose-based paper having an oxygen transmission rate of less than $cm^3/(m^2 \cdot day)$, when determined at 23° C. and 50% relative humidity, the compostable cellulose-based paper comprising a continuous cellulosic fiber matrix that comprises native cellulosic fibers and non-fibrous cellulosic material, wherein the content of the non-fibrous cellulosic material in the continuous cellulosic fiber matrix is of from 15 to 50 wt. %.

In the context of the present invention, the following definitions and test methods apply.

The expression "compostable" is generally defined in line with the EN13432 standard, in the version published in 2000, thus corresponding to the EN13432:2000 standard. The term "compostable cellulose-based paper" designates a cellulose-based paper comprising a maximum of 5% by weight of non-compostable components, thereby meeting EN13432:2000. The expression "compostable" when applied to a material or a product means that the material, or the entire product, will both biodegrade and disintegrate. By "biodegrade" it is meant that the chemical structure or the material breaks down under the action of micro-organisms, while by "disintegrates" it is meant that the material, or the product made from it, will physically fall apart into fine visually indistinguishable fragments, at the end of a typical composting cycle. In order to be considered a compostable polymer material, the polymer chains must break down under the action of the micro-organisms, so that total mineralization is achieved (i.e. conversion of the material into $CO_2$, water, inorganic compounds and bio mass under aerobic conditions) at a high rate compatible with the normal composting process of vegetable waste.

The term "fiber" as used herein refers to a material form characterized by an extremely high ratio of length to diameter. Generally, cellulose fibers have a very broad range of diameters and length based on fiber type and source of fiber. The average length of a wood pulp fiber as preferably used in the present invention is typically in the range of between from 0.3 mm to 3.5 mm, preferably from 0.3 mm to 3.0 mm, more preferably from 0.8 mm to 2.5 mm and even more preferably from 1.0 mm to 2.0 mm. The diameter of a wood pulp fiber is typically in the range of from 10 μm to 40 μm, preferably from 15 μm to 35 μm and more preferably from 20 μm to 30 μm. The aspect ratio (ratio of fiber length to fiber diameter) of a wood pulp fiber is therefore typically in the range of from 7.5 to 350, preferably from 7.5 to 300, more preferably from 10 to 200 and even more preferably from 20 to 150. The terms "fiber" and "filament" can be used interchangeably for the purposes of the present invention unless otherwise specifically indicated.

The term "cellulose fiber base sheet" refers to a non-woven fiber base sheet having a structure of individual fibers which are interlaid, but not in an identifiable manner as in a woven or knitted fabric, wherein the non-woven fiber base sheet is derived or prepared from cellulose fibers. A cellulose fiber is a fiber comprised substantially of cellulose. Non-woven materials can be formed from many processes such as, for example, spin laying, carding, air laying and water laying processes. The basis weight of non-woven materials such as a cellulose fiber base sheet is usually expressed in weight per unit area, for example in grams per square meter (gsm=$g/m^2$) or ounces per square foot (osf). The cellulose fiber base sheet used in the present invention is preferably a wet-laid paper sheet. Cellulose fiber base sheets which may be used in embodiments of the present invention include cellulose fibers from manmade sources (for example, regenerated cellulose fibers or lyocell fibers) or natural sources such as cellulose fibers or cellulose pulp from woody and non-woody plants. Woody plants include, for example, deciduous and coniferous trees. Non-woody plants include, for example, cotton, flax, esparto grass, kenaf, sisal, abaca, milkweed, straw, jute, hemp, and bagasse. Preferably, the cellulose fiber base sheet is a waterleaf sheet or a vegetable parchment, which is a wood pulp paper sheet having a porosity advantageous for allowing a gelatinizing agent to access the fibers during a parchmentizing process. The cellulose fiber base sheet used in the present invention preferably comprises hardwood fibers, more preferably eucalyptus fibers in an amount of at least 10% and preferably more than 50% relative to the total amount of fibers in the cellulose fiber base sheet.

The expression "cellulose material" describes a material comprised substantially of cellulose. The material may be a fiber or a film. Cellulose materials are derived from man-made sources such as regenerated cellulose fibers or films or from natural sources such as fibers or pulp from woody plants or non-woody plants.

The term "continuous cellulosic fiber matrix" refers to a cellulose material comprising native cellulosic fibers and non-fibrous cellulosic material, wherein the native cellulosic fibers are embedded in the non-fibrous cellulosic material, whereby the pores of the fibrous skeleton are blocked. The continuous cellulosic fiber matrix thus represents a dense material providing a cellulose continuum between the native cellulose fibers and the non-fibrous cellulosic material avoiding any voids at the interface between the native cellulose fibers and the non-fibrous cellulosic material. Therefore, the continuous cellulosic fiber matrix is a continuous, non-porous material having high gas barrier properties, especially towards oxygen. Preferably, the continuous cellulosic fiber matrix may consist of native cellulosic fibers, de-structured cellulosic fibers and non-fibrous cellulosic material.

The term "native cellulosic fibers" refers to cellulose fibers from natural sources such as woody plants including deciduous and coniferous trees or non-woody plants including cotton, flax, esparto grass, kenaf, sisal, abaca, milkweed, straw, jute, hemp and bagasse. Preferably, the native cellulosic fibers are suitable for being dissolved by the gelatinizing agent in a parchmentizing process. Suitable fibers for dissolution are, for example, Eucalyptus fibers, Birch fibers or other annual plant fibers. The native cellulosic fibers form a crystalline material comprising a crystallized fraction with the crystalline form of Cellulose I comprising all-parallel-oriented cellulose chains.

The term "non-fibrous cellulosic material" specifies a material, which is obtained by dissolving or partly dissolving the native cellulosic fibers with a gelatinizing agent (parchmentizing process), whereby the native cellulosic fibers disintegrate and form a gel-like viscous material, and subsequently eliminating the gelatinizing agent by washing with water, whereby the gel-like material precipitates to form a solid material. This solid material, which is referred to as the non-fibrous cellulosic material herein, is mostly amorphous and may comprise other forms of crystallized fraction such as a crystallized fraction with the crystalline form of Cellulose II comprising anti-parallel cellulose chains. The non-fibrous cellulosic material is preferably re-precipitated gelatinized cellulosic material.

The expression "de-structured cellulosic fibers" describes the periphery of a native cellulosic fiber that has been partially dissolved with a gelatinizing agent in a parchmentizing process, whereby a progressive structure change from native cellulose to precipitated cellulose is generated. Such a progressive structure change means that the structure of the continuous cellulosic fiber matrix contains a structural gradient, wherein the crystalline structure of the native cellulosic fiber slowly changes into the mostly amorphous structure of the non-fibrous cellulosic material by formation of de-structured cellulosic fibers on the surface of the native cellulosic fibers. The de-structured cellulosic fibers thus surround the native cellulosic fibers and are interposed between the native cellulosic fibers and the non-fibrous cellulosic material.

The term "regenerated cellulose" refers to manmade cellulose having a fibrous structure and obtained by chemical treatment of natural cellulose to form a soluble chemical derivative or intermediate compound and subsequent decomposition of the derivative to regenerate the cellulose having a fibrous structure. Regenerated cellulose includes spun rayon and cellophane film. Processes for preparing regenerated cellulose include the viscose process, the cuprammonium process and saponification of cellulose acetate.

The expression "synthetic fiber" refers to a fiber that has been formed of manmade material such as glass, polymer, combination of polymers, metal, carbon, regenerated cellulose, lyocell.

The "oxygen transmission rate (OTR)" of a material refers to the amount of oxygen ($cm^3$) that is transmitted through a specified area of the material ($m^2$) during one day at atmospheric pressure of 1.013 bar (1 atm), a temperature of 23° C. and a relative humidity of 50%. The oxygen transmission rate (OTR) ($cm^3/m^2 \cdot day$) is measured in accordance with ASTM D 3985 and ASTM F 1927. The OTR of a material is a measure for the gas barrier properties of the material and indicates the gas barrier level. In other words, the lower the OTR of a material, the smaller the amount of gas being transmitted through the material which results in the material offering a high barrier to gas, especially to oxygen.

The term "vegetable parchment" refers to a paper made by treating a cellulose paper sheet with a gelatinizing agent comprising, for example, sulfuric acid under conditions where the reaction time between the gelatinizing agent and the cellulose is limited to control cellulose dissolution, hydrolysis and degradation. The treated paper is then washed thoroughly so as to remove the gelatinizing agent, after which it is dried. The bath chemical partially dissolves or gelatinized the cellulose in the paper sheet. The dissolved cellulose is then precipitated when the bath chemical is diluted by washing the treated paper. This process, called parchmenting or parchmentizing, forms a very tough, stiff, smooth paper with an appearance somewhat like that of a genuine parchment. Because paper treated in this manner has a tendency to become brittle and to wrinkle upon drying, it is sometimes treated with a plasticizing agent, for example glycerin, glucose or Sorbitol. Vulcanized fiber is a related product made by treating a cellulose paper sheet with a gelatinizing agent comprising, for example, zinc chloride.

As described above, the first aspect of the present invention relates to a compostable cellulose-based paper having a low oxygen transmission rate of less than 10 $cm^3/(m^2 \cdot day)$, wherein the compostable cellulose-based paper comprises a continuous cellulosic fiber matrix that comprises native cellulosic fibers and non-fibrous cellulosic material in an amount of from 15 to 50 wt. %. The inventors have surprisingly found that the compostable cellulose-based paper is provided with high gas barrier properties, especially with high oxygen barrier properties, and with excellent mechanical properties when the non-fibrous cellulosic material is comprised in a content of 15 to 50 wt. %, preferably 15 to 40 wt. %, more preferably 18 to 35 wt. % and even more preferably 20 to 30 wt. %, in the continuous cellulosic fiber matrix.

One important aspect of the present invention resides in the discovery that the dissolution of native cellulosic fibers with a gelatinizing agent results in the formation of a non-fibrous cellulosic material further reinforcing the continuous cellulosic fiber matrix thus formed, whereby the compostable cellulose-based paper is provided with a higher rupture strength.

A further key aspect of the present invention is the discovery that the non-fibrous cellulosic material also serves to block substantially all of the pores of the fibrous skeleton by filling the voids between the native cellulosic fibers and providing a continuous, highly dense structure (continuous cellulosic fiber matrix), leading to the compostable cellulose-based paper having excellent gas barrier properties, especially towards oxygen, and providing excellent protection from moisture.

The compostable cellulose-based paper described herein can therefore be advantageously used as barrier layer for the construction of highly gas and moisture impermeable packaging material, especially as packaging material for oxygen-sensitive foods. Furthermore, as the compostable cellulose-based paper described herein has excellent mechanical properties with respect to wet strength, wet burst strength and dry burst strength, it can also be used as reinforcement layer for the construction of packaging material, particularly for the packaging of non-solid foods requiring food packaging having a predetermined shape.

The wet burst strength of the compostable cellulose-based paper is typically in the range of 100 kPa or more and preferably 150 kPa or more. The dry burst strength of the compostable cellulose-based paper is typically in the range of 200 kPa or more and preferably 250 kPa or more. The wet burst strength is measured according to ISO 3689 and the dry burst strength is measured according to ISO 2758.

The present invention provides a fully biodegradable, compostable and bio-sourced product that substantially consists of cellulose and acts as a gas barrier layer as well as a reinforcing layer. The continuous cellulosic fiber matrix comprised in the compostable cellulose-based paper may be directly generated in situ during a parchmentizing process, whereby energy required in the production can be saved and waste produced during the production can be reduced. Thus, the present compostable cellulose-based paper is easily and efficiently produced.

Continuous Cellulosic Fiber Matrix

The continuous cellulosic fiber matrix comprised in the compostable cellulose-based paper of the present invention includes native cellulosic fibers and non-fibrous cellulosic material. Preferably, the continuous cellulosic fiber matrix consists of native cellulosic fibers, de-structured cellulosic fibers and non-fibrous cellulosic material. In the continuous cellulosic fiber matrix, the native cellulosic fibers are essentially fully embedded in the non-fibrous cellulosic material, whereby any fiber release from the continuous cellulosic fiber matrix is prevented. The expression "essentially fully embedded" means that the native cellulosic fibers are ideally fully embedded in the non-fibrous cellulosic material, i.e. completely surrounded thereby. However, "essentially fully embedded" does not exclude that a part of the native cellulosic fibers is not covered with or embedded by the non-fibrous cellulosic material as long as the native cellulosic fibers are embedded to such an extent that they are firmly attached to the non-fibrous cellulosic material in the continuous cellulosic fiber matrix so that any fiber release therefrom is inhibited. Thus, when the compostable cellulose-based paper of the present invention is used as a packaging material for foods, a potential contamination with cellulose fibers of the packed food, especially of coffee during brewing, is avoided.

Figure 1B:
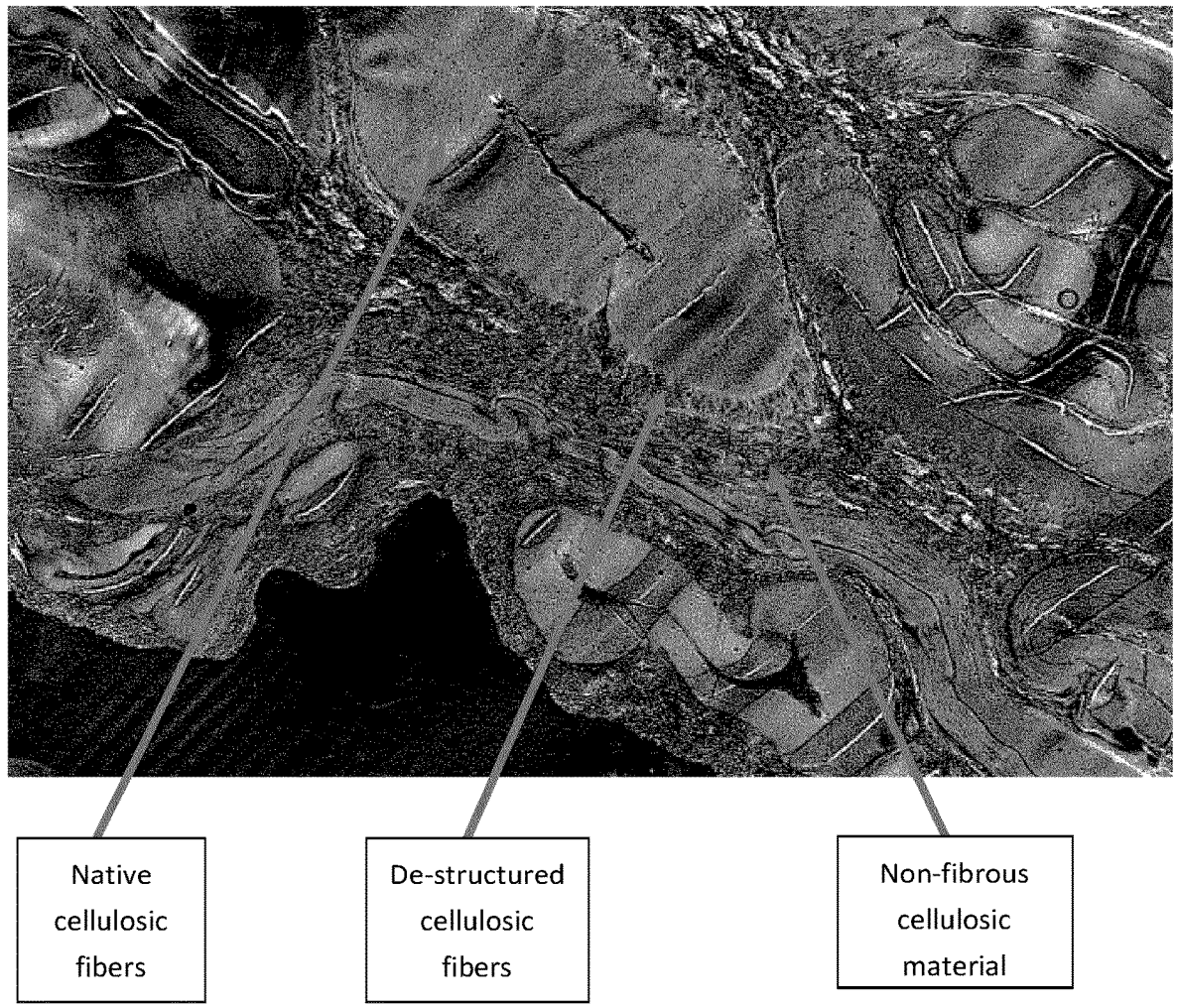
FIG. 1b shows a continuous cellulosic fiber matrix of a compostable cellulose-based paper according to another exemplary embodiment of the present invention as measured with a Transmission electron microscope (Transmission Electron Microscopy (TEM), Philips EM 400T, magnification of ×3000).

FIG. 1a shows an exemplary continuous cellulosic fiber matrix according to an embodiment of the present invention. FIG. 1b shows another, preferable exemplary continuous cellulosic fiber matrix according to an embodiment of the present invention. As can be seen from FIG. 1a and FIG. 1b, the present invention provides a seamless and continuous cellulose construction as all of the pores or voids in the fibrous material are filled by the non-fibrous cellulosic material, generating a very tight material offering good gas barrier properties and excellent mechanical strength. Thus, both, barrier properties against gas and moisture as well as mechanical strength can be achieved by the present compostable cellulose-based paper without requiring the presence of an additional layer.

The continuous cellulosic fiber matrix is preferably generated in situ during a parchmentizing process of a cellulose fiber base sheet including native cellulosic fibers with a gelatinizing agent, whereby a non-porous, more continuous structure can be obtained than by impregnation of a cellulose fiber base sheet with regenerated cellulose. This is due to the absence of an interface being formed between the native cellulosic fibers and the non-fibrous cellulosic material. Even when impregnating the cellulose fiber base sheet with a large amount of regenerated cellulose, i.e. with twice as much regenerated cellulose compared to the amount of non-fibrous cellulosic material comprised in the compostable cellulose-based paper of the present invention, the paper obtained after such an impregnation process still remains porous and additional coating layers are needed to reach sufficient barrier properties towards gas and moisture.

Cellulose Fiber Base Sheet

The cellulose fiber base sheet comprises native cellulose fibers and optionally additional non-cellulose fibers, which are synthetic fibers. In a preferred embodiment of the invention, at least 50 percent, preferably at least 60 percent, even more preferably at least 80 percent of the fibers in the non-woven base sheet are cellulose fibers. In a more preferable embodiment, at least 90 percent, preferably at least 95 percent and most preferably 100 percent of the fibers in the non-woven base sheet are cellulose fibers. The cellulose fiber base sheet therefore advantageously consists substantially of cellulose fibers from the viewpoint of biodegradability. It is most preferable that the cellulose fiber base sheet is 100% biodegradable. The cellulose fiber base sheet therefore preferably contains no more than 5 wt. % of non-compostable material or material of undetermined compostability in order to meet the requirements of the EN 13432 standard. Most preferably, any additives added to the cellulose fiber base sheet are compostable.

Although not limited thereto, it is preferable that the cellulose fiber base sheet has a sufficient porosity to allow easier penetration of the gelatinizing agent used in the parchmentizing process into the fibrous structure of the cellulose fiber base sheet. The porosity of the sheet can be measured using a Bendtsen porosity tester, which calculates porosity by forcing air through the sheet and measuring the rate of flow, according to ISO 5636-3 standard. The cellulose fiber base sheet preferably has a Bendsten porosity in the range of from 1000 ml/min to 3000 ml/min, more preferably from 1500 ml/min to 2500 ml/min and most preferably from 1800 ml/min to 2200 ml/min.

When the Bendsten porosity of the cellulose fiber base sheet is lower than 1000 ml/min, the gelatinizing agent may not reach the core of the fibrous structure of the cellulose fiber base sheet and the continuous cellulosic fiber matrix may not be sufficiently formed and the gas barrier properties of the compostable cellulose-based paper may be decreased. On the other hand, when the Bendsten porosity of the cellulose fiber base sheet is higher than 3000 ml/min, the cellulose fiber base sheet may not have enough mechanical strength to run through the parchmentizing process as the cellulose fiber base sheet may be more easily ruptured.

However, it is still possible to use a cellulose fiber base sheet with a porosity lower than 1000 ml/min, by adjusting process parameters in making the base sheet as well as during a parchmentization step in an acid bath. For example, one skilled in the art would adapt process parameters such as the machine speed to find a balance between sufficient migration of the gelatinizing agent to the core of the fibrous structure of the cellulose fiber and excessive gelatinization of said fibrous structure leading to loss of structural integrity. A lower basis weight or thinner sheet may also be used to improve penetration of the gelatinizing agent.

Preferably, the cellulose fiber base sheet comprises wood pulp fibers with a defined degree of polymerization (DP) of less than 500, preferably 200 to 400, more preferably 300 so as to simplify the dissolution with a gelatinizing agent during a parchmentizing process. If the DP is too high, dissolution of the cellulose will be too long and less gel-like material forming the non-fibrous cellulosic material will be generated within a defined time period. If the DP is too low, too much hydrolysis will occur compared to dissolution leading to the mechanical properties of the non-fibrous cellulosic material in final product being degraded.

In a preferred embodiment, the cellulose fiber base sheet is a waterleaf sheet or a vegetable parchment. In a more preferable embodiment, the cellulose fiber base sheet is made of Eucalyptus pulp.

The basis weight of the cellulose fiber base sheet may be selected according to the fiber and/or filament constitution and the intended end use. In some embodiments, the basis weight of the cellulose fiber base sheet on a dry basis may be 200 gsm or less, preferably from 30 gsm to 130 gsm. When the basis weight of the cellulose fiber base sheet is within these ranges, the compostable cellulose-base paper obtained therewith has excellent mechanical properties and offers excellent barrier properties. That is, the cellulose fiber base sheet having a bases weight within the above ranges advantageously exhibits a wet burst strength above 150 kPa and a dry burst strength above 250 kPa, wherein the wet burst to dry burst ratio is at least 50%.

The cellulose fiber base sheet typically has an average thickness of from 30 μm to 150 μm, preferably from 50 μm to 130 μm, even more preferably from 80 μm to 120 μm and most preferably about 100 μm from the viewpoint of achieving excellent mechanical reinforcement properties.

Typically, the cellulose fiber base sheet will not include binders and other additives. However, additives may be used to achieve specific desired results. For example, a thermosetting resin such as KYMENE available from Hercules Incorporated of Wilmington, Delaware, USA can be added to modify reactivity of the fibers in the cellulose fiber base sheet to subsequent process operations, for example gelatinizing, or a wet strength agent might be advantageous to provide the wet base sheet with strength to endure subsequent operations without breaking or a filler such as $TiO_2$ may be added to modify opacity of the cellulose fiber base sheet. Preferably, the base sheet contains no more than wt. % of non-compostable material or material of undetermined compostability, in order to meet the requirements of the EN 13432 standard. Most preferably, any additives that are added are biodegradable and/or compostable.

Native Cellulosic Fibers

The native cellulosic fibers are derived from natural sources or manmade sources. Preferably, the native cellulosic fibers are selected from wood pulp fibers, non-wood vegetable fibers and regenerated cellulose fibers. The native cellulosic fibers are preferably Eucalyptus fibers, Birch fibers or other annual plant fibers such as cotton fibers, hemp fibers or flax fibers (preferably cotton fibers), preferably hardwood fibers, from the viewpoint of dissolvability with a gelatinizing agent in a parchmentizing process of the cellulose fiber base sheet. The native cellulosic fibers typically form a crystalline material in the continuous cellulosic fiber matrix comprising the crystalline form of Cellulose $I_\alpha$ and/or Cellulose $I_\beta$, wherein the cellulose chains are oriented parallel.

The native cellulose fibers may be applied to the cellulose fiber base sheet as a pre-formed web or tissue, for example by means of a wet-laying or air-laying process. The choice of cellulose application process will typically be dependent on available process equipment. The native cellulose fibers will be applied in an amount of, in general, from about 10 gsm to about 200 gsm, advantageously less than 200 gsm and typically from about 30 gsm to about 130 gsm.

The native cellulosic fibers may be comprised in the continuous cellulosic fiber matrix in an amount of 60 to 85 wt. %, preferably 65 to 82 wt. % and more preferably 70 to 80 wt. %. When a lower amount of native cellulosic fibers is comprised, the reinforcement strength provided by the fibers may not be sufficient and the compostable cellulose-based paper may be ruptured more easily. Furthermore, the three-dimensional stability of the compostable cellulose-based paper may not be sufficient for packaging non-solid foods that require a packaging material having a predetermined shape. On the other hand, when the amount of the native cellulosic fibers is too high, it becomes difficult for the gelatinizing agent to penetrate the fibrous material and the continuous cellulosic fiber matrix may not be sufficiently formed. In this case, the compostable cellulose-based paper may remain porous and the barrier properties towards gas and moisture may be decreased. In a preferable embodiment, wherein the continuous cellulosic fiber matrix further comprises de-structured cellulosic fibers in addition to the native cellulosic fibers and the non-fibrous cellulosic material, the amount of the native cellulosic fibers may be 65 to 80 wt. %.

The diameter of the cellulose fibers is preferably 10 μm to 40 μm, more preferably from 15 μm to 35 μm and even more preferably from 20 μm to 30 μm. The length of the cellulose fibers is preferably 0.3 mm to 3.5 mm, more preferably from 0.3 mm to 3.0 mm, even more preferably from 0.8 mm to 2.5 mm and most preferably from 1.0 mm to 2.0 mm. Therefore, the average aspect ratio (ratio between the length and the diameter of the cellulose fibers) is preferably 7.5 to 350, more preferably from 7.5 to 300, even more preferably from 10 to 200 and most preferably from 20 to 150.

Non-Fibrous Cellulosic Material

The non-fibrous cellulosic material typically forms a mostly amorphous material in the continuous cellulosic fiber matrix surrounding the native cellulosic fibers. A small fraction of the non-fibrous cellulosic material may comprise the crystalline form of Cellulose II, wherein the cellulose chains are oriented anti-parallel.

The non-fibrous cellulosic material is comprised in the continuous cellulosic fiber matrix in an amount of 15 to 50 wt. %. When the content of non-fibrous cellulosic material is less than 15 wt. %, the pores of the cellulose fiber base sheet cannot be sufficiently blocked, and the compostable cellulose-based paper remains porous. Thus, sufficient barrier properties towards gas and moisture, especially sufficient oxygen barrier properties, may not be achieved. Furthermore, when the amount of non-fibrous cellulosic material is too small, the mechanical strength of the continuous cellulosic fiber matrix may be decreased. On the other hand, when the content of non-fibrous cellulosic material is more than 50 wt. %, the native cellulosic fibers comprised in the continuous cellulosic fiber matrix may be more widely spread, whereby desired reinforcement properties obtained by the fibers may not be achieved. It may then be difficult to use the compostable cellulose-based paper as a packaging material having a predetermined shape, e.g. for packaging non-solid foods.

In a preferable embodiment, the content of the non-fibrous cellulosic material in the continuous cellulosic fiber matrix is from 15 to 40 wt. %, In another, more preferably embodiment, the content of the non-fibrous cellulosic material in the continuous cellulosic fiber matrix is from 18 to 35 wt. %. In another, even more preferable embodiment, the content of the non-fibrous cellulosic material in the continuous cellulosic fiber matrix is from 20 to 30 wt. %.

In order to arrive at a content of non-fibrous cellulosic material in the continuous cellulosic fiber matrix within the present invention, the parchmentizing conditions have to be appropriately set, for example, in terms of reaction time. Appropriate parchmentizing conditions are described later on.

The non-fibrous cellulosic material is obtained by partly dissolving the native cellulosic fibers with a gelatinizing agent in a parchmentizing process creating a gel-like material, and subsequently re-precipitating the gel-like material to form a solid material. The thus formed non-fibrous cellulosic material serves to fill up the pores and voids in the fibrous structure of the cellulose fiber base sheet, thus creating a dense, non-porous material that inhibits the flow of oxygen through the material. The non-fibrous cellulosic material is formed around each of the native cellulosic fibers and serves to stick the fibers together, whereby the continuous cellulosic fiber matrix is formed.

By including 15 to 50 wt. % of the non-fibrous cellulosic material in the continuous cellulosic fiber matrix, the compostable cellulose-based paper has a low oxygen transmission rate of less than 10 cm$^3$/(m$^2$·day).

Preparation of the Compostable Cellulose-Based Paper

The compostable cellulose-based paper of the present invention may be prepared by any commonly employed parchmentizing process well known in the art. That is, the cellulose fiber base sheet can be treated with a gelatinizing agent by passing it through a bath containing the gelatinizing agent, under predefined conditions of time and temperature. Suitable conditions for treating the cellulose fiber base sheet with a gelatinizing agent are readily determined by a person skilled in the art.

The continuous cellulosic fiber matrix of the compostable cellulose-based paper may be obtained by
(i) providing a cellulose fiber base sheet comprising cellulose fibers;
(ii) treating the cellulose fiber base sheet with a gelatinizing agent to give a treated base sheet comprising non-fibrous cellulosic material;
(iii) washing the treated base sheet comprising the non-fibrous cellulosic material to obtain a precursor cellulosic fiber matrix;
(iv) drying the precursor cellulosic fiber matrix to obtain the continuous cellulosic fiber matrix.

When contacting the cellulose fiber base sheet with the gelatinizing agent in step (ii), for example by immersing the cellulose fiber base sheet in a bath of the gelatinizing agent or passing the cellulose fiber base sheet through the gelatinizing agent, the native cellulosic fibers are partially dissolved and form a gel-like, viscous material that fills the pores and voids in the fibrous material, and a treated base sheet is obtained (parchmentizing process). The treated base sheet is subsequently washed in step (iii) with a washing agent to remove the gelatinizing agent therefrom. Preferably, the treated base sheet is washed with water in step (iii). Thus, a precursor cellulosic fiber matrix is obtained, which comprises native cellulosic fibers and the gel-like material. Thereafter, the precursor cellulosic fiber matrix is dried in step (iv) to remove any residual washing agent and/or moisture and the continuous cellulosic fiber matrix is obtained.

The gelatinizing agent can be appropriately selected in accordance with the cellulose base paper sheet. The gelatinizing agent may comprise at least one cellulose solvent selected from the group consisting of inorganic acids comprising sulfuric acid and phosphoric acid, Lewis acids comprising ZnCl$_2$ and Ca(SCN)$_2$, inorganic bases comprising NaOH, organic bases comprising N-methylmorpholine N-oxide, and ionic liquids comprising tetraalkylammonium salts. In a preferable embodiment, the gelatinizing agent comprises sulfuric acid.

Under normal parchmentizing conditions the gelatinizing agent is a mineral acid, advantageously sulfuric acid, in aqueous solution at a concentration of 55 percent to 85 percent by weight and advantageously at a concentration of 63 percent to percent by weight from the viewpoint of forming a continuous cellulosic fiber matrix having a desirable content of non-fibrous cellulosic material.

The treatment duration in step (ii) is preferably at least 60 seconds so that the non-fibrous cellulosic material is formed in an amount of 15 to 50 wt. % in the continuous cellulosic fiber matrix. Advantageously, the cellulose fiber base sheet is contacted in step (ii) with the gelatinizing agent for at least 90 seconds to ensure that all the pores and voids of the fibrous material are blocked, whereby the barrier properties of the compostable cellulose-based paper can be improved.

The mineral acid used as a gelatinizing agent is typically at a temperature of −10° C. to 25° C. and advantageously −5° C. to 20° C. The gelatinizing agent serves to partially dissolve or gelatinize portions of the cellulose fibers contacting the agent. Typically, no more than 30 percent of the cellulose in the treated base sheet is dissolved by the gelatinizing agent.

As the treated base sheet is conveyed into, through and out of the bath of the gelatinizing agent, it passes over and under material handling rolls. Passage of the treated base sheet over the rolls helps to smear or spread the non-fibrous cellulosic material over the sheet surface and between the other fibers of the sheet.

In a preferable embodiment of the present invention, the compostable cellulose-based paper is prepared by the process including steps (i) to (iv) as described above,
wherein
the cellulosic fiber base sheet provided in step (i) has a Bendsten porosity of from 1000 ml/min to 3000 ml/min and a thickness of from 30 μm to 150 μm, and the cellulosic fibers comprised in the cellulosic fiber base sheet have a fiber diameter of 10 μm to 40 μm and a fiber length of 0.3 mm to 3.5 mm,
sulfuric acid having a concentration of 55 to 85 percent by weight is used as the gelatinizing agent, and
the cellulosic fiber base sheet is treated in step (ii) for at least 60 seconds with the gelatinizing agent at a temperature of −10° C. to 25° C.

When preparing the compostable cellulose-based paper according to this preferable embodiment, the compostable cellulose-based paper has excellent mechanical properties and excellent barrier properties of
an oxygen transmission rate of less than 10 cm$^3$/(m$^2$·day), when determined at 23° C. and 50% relative humidity,
a wet burst strength of 150 kPa or more, and
a dry burst strength of 200 kPa or more.

Compostable Cellulose-Based Paper

The compostable cellulose-based paper may comprise the continuous cellulosic fiber matrix and further optional components. Such optional components include synthetic fibers, preferably synthetic fibres which are also biodegradable fibres. The total amount of fibers that are non-biodegradable or of undetermined biodegradability however should preferably be less than 5 wt. % relative to the entire components of the compostable cellulose-based paper so as to maintain biodegradability thereof. Preferably, the compostable cellulose-based paper may substantially consist of the continuous cellulosic fiber matrix.

The compostable cellulose-based paper has an oxygen transmission rate of less than 10 cm$^3$/(m$^2$·day) form the viewpoint of providing sufficient barrier properties towards gas and moisture, especially towards oxygen. Advantageously, the oxygen transmission rate is less than 2 cm$^3$/(m$^2$·day), preferably less than 1 cm$^3$/(m$^2$·day). The oxygen transmission rate is determined at 23° C. and 50% relative humidity under atmospheric pressure (1 atm) and is measured according to ASTM D 3985 and ASTM F 1927.

The basis weight and the thickness of the compostable cellulose-based paper may be selected according to the intended end use. In some embodiments, the basis weight of the compostable cellulose-based paper on a dry basis may be 200 gsm or less, preferably from 30 gsm to 130 gsm. The thickness of the compostable cellulose-based paper may be from 30 μm to 250 μm, preferably from 30 μm to 150 μm, more preferably from 80 to 120 μm and most preferably about 100 μm.

The compostable cellulose-based paper comprising 15 to 50 wt. %, preferably 20 to 30 wt. %, of the non-fibrous cellulosic material has excellent mechanical properties and excellent barrier properties of
- an oxygen transmission rate of less than 10 $cm^3/(m^2 \cdot day)$, preferably less than 2 $cm^3/(m^2 \cdot day)$, when determined at 23° C. and 50% relative humidity,
- a wet burst strength of 100 kPa or more, preferably 150 kPa or more, and
- a dry burst strength of 200 kPa or more, preferably 250 kPa or more.

The compostable cellulose-based paper of the present invention can be used as packaging material for gas and/or moisture sensitive products, especially as packaging material for oxygen sensitive foods. Preferably, the compostable cellulose-based paper can be used in the construction of coffee capsules or coffee pads due to its excellent barrier properties and mechanical strength.

Packaging Material

In a second aspect, the present invention relates to a packaging material for oxygen sensitive products comprising the compostable cellulose-based paper described herein. The packaging material is not particularly limited and can be used for preserving food such as, for example, oxygen sensitive food. The packaging material may for example be selected from the group consisting of butter wrapping, beverage container, coffee capsule, coffee pad, chocolate packaging and biscuit packaging. Preferably, the packaging material is used in the construction of a coffee capsule or a coffee pad.

The packaging material comprises the cellulose-based paper and optionally additional layers. That is, the packaging material may be a multi-layer product comprising the compostable cellulose-based paper as a first material layer and at least one additional material layer, wherein the at least one additional material layer is laminated on a surface of the compostable cellulose-based paper. The additional layer is not particularly limited and may be appropriately selected dependent on the desired additional property, with which the packaging material should be supplemented. The additional layer is preferably selected from the group consisting of a water vapor barrier layer, an aroma barrier layer, a water-resistant layer, a thermo-sealable layer, a grease-resistant layer and a printable layer.

EXAMPLES

The following raw materials have been used in the present examples.

Cellulose fiber base sheet: waterleaf sheet including eucalyptus fibers having an average fiber length of from 1.0 to 3.0 mm, an average fiber diameter of from 15 μm to 20 μm and an aspect ratio (fiber length/fiber diameter) of from 50 to 200; the cellulose fiber base sheet has a basis weight of gsm and is based on 100% cellulose with a level of refining of 30° SR (Schopper-Riegler); the average thickness of the cellulose fiber base sheet is 102 μm.

Gelatinizing agent: sulfuric acid having a concentration of from 70% to 75%.

The properties of the compostable cellulose-based papers prepared in the present examples have been measured according to the following methods.

The oxygen transmission rate (OTR) has been measured in accordance with ASTM D 3985 and ASTM F 1927. The wet burst strength has been measured according to ISO 3689 and the dry burst strength has been measured according to ISO 2758.

Method of determining the content of non-fibrous cellulosic material in the compostable cellulose-based paper: The weight of the compostable cellulose-based paper is measured prior to starting the test. The compostable cellulose-based paper is then macerated in an enzymatic solution comprising cellulases at room temperature and normal pressure of 1 atm. The cellulases start digesting the paper, commencing cellulose degradation with the most accessible material, which is the less crystalline material meaning the non-fibrous cellulosic material that is present between the cellulose fibers in the compostable cellulose-based paper. As the non-fibrous cellulosic material disappears from the structure due to digestion by the cellulases, the cellulose fibers are less and less bonded together and the mechanical strength of the compostable cellulose-based paper dramatically decreases. The degradation of the compostable cellulose-based paper is followed by measuring the mechanical strength properties of the compostable cellulose-based paper like tensile strength, wet burst strength and dry burst strength.

The mechanical strength of the compostable cellulose-based paper decreases with time, due to the progress of the degradation, until a plateau is reached. At this point, the weight of the compostable cellulose-based paper is measured again. The loss in weight of the compostable cellulose-based paper after reaching the plateau of decreased mechanical strength in comparison to its initially measured weight corresponds to the total disappearance of the non-fibrous cellulosic material being digested by the cellulases. The loss of weight between the initial sample and the degraded compostable cellulose-based paper (when plateau is reached) correspond to the amount of non-fibrous cellulosic material in the compostable cellulose-based paper.

Example 1 and Comparative Examples 1 to 3

The cellulose fiber base sheet was immersed in a bath of the gelatinizing agent, which was kept at a temperature of between –6° C. and –2° C., for a specific duration of time as indicated in Table 1 below. The treated base sheet was subsequently washed with fresh water for at least 1 minute to neutralize the reaction and obtain a precursor cellulosic fiber matrix. The precursor cellulosic fiber matrix was then dried at 90° C. for at least 1 minute to obtain a compostable cellulose-based paper comprising a continuous cellulosic fiber matrix.

TABLE 1

|  | Contact time [sec] | Oxygen transmission rate [$cm^3/(m^2 \cdot day)$] | Content of non-fibrous cellulosic material [wt. %] |
| --- | --- | --- | --- |
| Comparative Example 1 | 15 | >5000 | <10 |

TABLE 1-continued

| | Contact time [sec] | Oxygen transmission rate [cm$^3$/(m$^2$ · day)] | Content of non-fibrous cellulosic material [wt. %] |
|---|---|---|---|
| Comparative Example 2 | 30 | 86 | <15 |
| Comparative Example 3 | 45 | 97 | <15 |
| Example 1 | 60 | 0.26 | 20-30 |

Comparative Examples 4 and 5

In common industrial processes for preparing compostable cellulose-based papers, the reaction time in the parchmentization (contact time with the gelatinizing agent) is approximately 10 seconds leading to the obtained products having lower barrier properties. This is shown for two exemplary industrial compostable cellulose-based papers in Table 2.

TABLE 2

| | Industrial product | Oxygen transmission rate [cm$^3$/(m$^2$ · day)] |
|---|---|---|
| Comparative Example 4 | SULPACK NL 70 gsm (code 1501070) | 533 925 |
| Comparative Example 5 | Sulflex 70 gsm SVM (code 240070) | 750 |

Example 2 and Comparative Examples 6 and 7

Furthermore, the following compostable cellulose-based papers of Example 2 and Comparative Examples 6 and 7 have been prepared using an industrial method, similar to Comparative Examples 4 and 5, i.e. by contacting the cellulose fiber base sheet with the gelatinizing agent for approximately 10 seconds. For Example 2, the contact time with the gelatinizing agent has been increased to approximately 20 seconds resulting in a higher content of the non-fibrous cellulosic material, thus providing excellent gas barrier properties and mechanical properties in comparison to Comparative Examples 6 and 7 having lower amounts of the non-fibrous cellulosic material as shown in Table 3.

TABLE 3

| | Example 2 | Comparative Example 6 | Comparative Example 7 |
|---|---|---|---|
| Product specification | GVP based on Waterleaf sheet of the invention (60 g/m$^2$) | Standard GVP SULFLEX for furniture applications | Standard GVP SULPACK for cooking & baking applications |
| Content of non-fibrous cellulosic material [wt. %] | High (>20, within claimed range) | Medium (<15) | Low (<10) |
| Oxygen transmission rate [cm$^3$/(m$^2$ · day)] | 0.4 | 191 | 150 000 |
| Basis weight [g/m$^2$] | 72.0 ± 3.7 | 76.1 ± 2.1 | 74.5 ± 0.6 |
| Thickness [μm] | 79 ± 1.6 | 78 ± 1.9 | 85 ± 1.3 |
| Dry burst strength [kPa] | 302 ± 13.6 | 316 ± 19.0 | 448 ± 26.2 |

TABLE 3-continued

| | Example 2 | Comparative Example 6 | Comparative Example 7 |
|---|---|---|---|
| strength [kPa] | | | |
| Wet burst strength [kPa] | 172 ± 20.6 | — | 248 ± 9.7 |

The invention claimed is:

1. Compostable cellulose-based paper having an oxygen transmission rate of less than 10 cm$^3$/(m$^2$·day), when determined at 23° C. and 50% relative humidity, the compostable cellulose-based paper comprising a continuous cellulosic fiber matrix that comprises native cellulosic fibers and non-fibrous cellulosic material, wherein the content of the non-fibrous cellulosic material in the continuous cellulosic fiber matrix is of from 15 to 50 wt. %.

2. Compostable cellulose-based paper according to claim 1, wherein the continuous cellulosic fiber matrix is obtainable by:
(i) providing a cellulose fiber base sheet comprising cellulose fibers;
(ii) treating the cellulose fiber base sheet with a gelatinizing agent to give a treated base sheet comprising non-fibrous cellulosic material;
(iii) washing the treated base sheet comprising the non-fibrous cellulosic material to obtain a precursor cellulosic fiber matrix;
(iv) drying the precursor cellulosic fiber matrix to obtain the continuous cellulosic fiber matrix.

3. Compostable cellulose-based paper according to claim 2, wherein the gelatinizing agent comprises at least one cellulose solvent selected from the group consisting of inorganic acids comprising sulfuric acid and phosphoric acid, Lewis acids comprising $ZnCl_2$ and $Ca(SCN)_2$, inorganic bases comprising NaOH, organic bases comprising N-methylmorpholine N-oxide, and ionic liquids comprising tetraalkylammonium salts.

4. Compostable cellulose-based paper according to claim 3, wherein the gelatinizing agent is sulfuric acid and/or wherein the sulfuric acid has a concentration of from 63 to 75%.

5. Compostable cellulose-based paper according to claim 2 wherein step (ii) involves contacting the cellulose fiber base sheet with the gelatinizing agent for at least 60 seconds.

6. Compostable cellulose-based paper according to claim 2, wherein the washing in step (iii) is carried out with water.

7. Compostable cellulose-based paper according to claim 2, wherein the cellulose fibers are selected from wood pulp fibers, non-wood vegetable fibers and regenerated cellulose fibers.

8. Compostable cellulose-based paper according to claim 1, wherein the compostable cellulose-based paper has
a wet burst strength of 150 kPa or more, and
a dry burst strength of 200 kPa or more.

9. Compostable cellulose-based paper according to claim 1, wherein the compostable cellulose-based paper has a basis weight of 200 g/m$^2$ or less and/or a thickness of from 30 μm to 250 μm.

10. Compostable cellulose-based paper according to claim 1, wherein the continuous cellulosic fiber matrix comprises of from 15 to 40 wt. % of the non-fibrous cellulosic material.

11. Compostable cellulose-based paper according to claim 1, wherein the oxygen transmission rate of the compostable cellulose-based paper is less than 2 cm$^3$/(m$^2$·day), when determined at 23° C. and 50% relative humidity.

12. Packaging material for oxygen sensitive products comprising the compostable cellulose-based paper according to claim 1.

13. Packaging material according to claim 12, which is selected from the group consisting of butter wrapping, beverage container, coffee capsule, coffee pad, chocolate packaging and biscuit packaging.

14. Packaging material according to claim 12, wherein the packaging material is a multi-layer product comprising the compostable cellulose-based paper as a first material layer and at least one additional material layer, wherein the at least one additional material layer is laminated on a surface of the compostable cellulose-based paper.

15. Packaging material according to claim 14, wherein the at least one additional material layer is selected from the group consisting of a water vapor barrier layer, an aroma barrier layer, a water-resistant layer, a thermo-sealable layer, a grease-resistant layer and a printable layer.

16. Compostable cellulose-based paper according to claim 2, wherein the compostable cellulose-based paper has
a wet burst strength of 150 kPa or more, and
a dry burst strength of 200 kPa or more.

17. Compostable cellulose-based paper according to claim 2, wherein the compostable cellulose-based paper has a basis weight of 200 g/m$^2$ or less and/or a thickness of from 30 μm to 250 μm; and wherein the continuous cellulosic fiber matrix comprises of from 15 to 40 wt. % of the non-fibrous cellulosic material.

18. Compostable cellulose-based paper according to claim 2, wherein the oxygen transmission rate of the compostable cellulose-based paper is less than 2 cm$^3$/(m$^2$·day), when determined at 23° C. and 50% relative humidity.

19. Packaging material for oxygen sensitive products comprising the compostable cellulose-based paper according to claim 2.

20. Packaging material according to claim 19, which is selected from the group consisting of butter wrapping, beverage container, coffee capsule, coffee pad, chocolate packaging and biscuit packaging; and
wherein the packaging material is a multi-layer product comprising the compostable cellulose-based paper as a first material layer and at least one additional material layer, wherein the at least one additional material layer is laminated on a surface of the compostable cellulose-based paper; and
wherein the at least one additional material layer is selected from the group consisting of a water vapor barrier layer, an aroma barrier layer, a water-resistant layer, a thermo-sealable layer, a grease-resistant layer and a printable layer.

* * * * *